United States Patent
Larson, Jr. et al.

(10) Patent No.: US 10,214,297 B2
(45) Date of Patent: Feb. 26, 2019

(54) REMOTE POWER SOURCE PUMP SYSTEM

(71) Applicant: Hamilton Sundstrand Corporation, Windsor Locks, CT (US)

(72) Inventors: Michael E. Larson, Jr., Rockford, IL (US); Gary Sasscer, Leaf River, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 919 days.

(21) Appl. No.: 14/454,184

(22) Filed: Aug. 7, 2014

(65) Prior Publication Data
US 2016/0039532 A1 Feb. 11, 2016

(51) Int. Cl.
| | |
|---|---|
| *B64D 41/00* | (2006.01) |
| *F16K 11/07* | (2006.01) |
| *F15B 7/00* | (2006.01) |
| *F15B 15/14* | (2006.01) |

(52) U.S. Cl.
CPC ............ *B64D 41/007* (2013.01); *F15B 7/006* (2013.01); *F15B 15/1476* (2013.01); *F15B 2211/20507* (2013.01); *F15B 2211/20538* (2013.01); *F15B 2211/30525* (2013.01); *F15B 2211/321* (2013.01); *F15B 2211/7052* (2013.01)

(58) Field of Classification Search
CPC .................. F15B 7/006; F15B 15/1476; F15B 2211/20507; F15B 2211/20538; F15B 2211/30525; F15B 2211/321; F15B 2211/7052; F04B 9/02; F04B 9/10; F04B 9/109
USPC ......................................................... 417/307
See application file for complete search history.

(56) References Cited

U.S. PATENT DOCUMENTS

| | | | | |
|---|---|---|---|---|
| 5,193,561 | A | * 3/1993 | Robb | B08B 3/02 134/102.1 |
| 5,881,840 | A | * 3/1999 | Mize | F01M 11/045 184/1.5 |
| 5,992,014 | A | * 11/1999 | Beery | B25B 13/48 29/888.01 |
| 2005/0224193 | A1* | 10/2005 | Nelzi | E05D 13/006 160/188 |
| 2011/0126912 | A1* | 6/2011 | Grimseth | E21B 33/0355 137/1 |

(Continued)

FOREIGN PATENT DOCUMENTS

| | | |
|---|---|---|
| EP | 2154196 A1 | 2/2010 |
| GB | 1052706 A1 * | 8/1965 |
| WO | WO2009138849 A1 | 11/2009 |

OTHER PUBLICATIONS

French Office Action from Application No. 1556779, dated Mar. 2, 2018, 8 pages.

*Primary Examiner* — Dominick L Plakkoottam
*Assistant Examiner* — Connor J Tremarche
(74) *Attorney, Agent, or Firm* — Kinney & Lange, P.A.

(57) ABSTRACT

A pump system includes an actuator which can be retracted by a fluid in the pump system. Also included is a pump with a first drive coupling and a rotational power device with a second drive coupling. The second drive coupling is configured to removably mate with the first drive coupling for powering the pump. A spool valve that is spring loaded and in fluid connection with the pump when the spool valve is in a stow position is also included. In addition, the pump system includes both a relief valve and a reservoir both in fluid connection with the actuator.

11 Claims, 2 Drawing Sheets

(56) References Cited

U.S. PATENT DOCUMENTS

2011/0236218 A1* 9/2011 Russ ................... B64D 41/007
  416/246
2012/0286221 A1* 11/2012 Doyle ..................... B66F 3/42
  254/98

* cited by examiner

REMOTE POWER SOURCE PUMP SYSTEM

BACKGROUND

The present embodiments relate to hydraulic pump systems.

In one example application, a manual hydraulic pump can be used to stow an aircraft component. One such aircraft component can include a ram air turbine ("RAT"). During normal flight conditions the RAT remains stowed inside the aircraft (e.g., fuselage or wing), but upon complete loss of power to the aircraft the RAT is deployed and generates power for the aircraft using an airstream produced by the speed of the aircraft. The RAT can also be deployed during installation and door rigging, where it is not uncommon for the RAT to be deployed (and thus stowed) over ten times.

Stowing the RAT after a deployment can differ depending on the aircraft. Generally in larger aircraft, RAT systems have an actuator connected to the aircraft's hydraulic systems which allows the RAT to be stowed using the aircraft's operating pressure. However, in small and mid-sized aircraft, such as regional and business jets, RAT systems are generally not connected to the aircraft's hydraulic systems. In such instances where the RAT is not connected to the aircraft's hydraulic systems, a manual hydraulic pump is used to stow the RAT in a ground operation. The manual hydraulic pump has a small displacement and requires extensive manual stroking to stow the RAT. In fact, stowing the RAT generally requires over 100 strokes for a dual stage pump, and over 150 strokes for a single stage pump. Consequently, use of a manual hydraulic pump to stow a RAT creates a physical burden and increases installation time due to the continual deployment and stowing of the RAT during installation.

SUMMARY

One embodiment includes a pump system with an actuator which can be retracted by a fluid in the pump system. Also included is a pump with a first drive coupling and a rotational power device with a second drive coupling. The second drive coupling is configured to removably mate with the first drive coupling for powering the pump. A spool valve that is spring loaded and in fluid connection with the pump when the spool valve is in a stow position is also included. In addition, the pump system includes both a relief valve and a reservoir both in fluid connection with the actuator.

Another embodiment includes a method of retracting an actuator in a pump system. The method includes coupling a rotational power device to a pump for powering the pump, toggling a spring loaded spool valve to a stow position to direct a fluid in the pump system to flow from the spool valve to the pump, directing the fluid from the pump through a relief valve and to an actuator, and retracting the actuator with the fluid in the pump system.

A further embodiment includes a spool valve. The spool valve includes a connection with a pump which allows the spool valve to toggle between a free flow position and a stow position. The spool valve additionally includes a spring coupled to the spool valve, a first portion with a first fluid circuit connection and a first fluid circuit stop, and a second portion with a second fluid circuit connection and a second fluid circuit stop. When the spool valve is in the free flow position the first fluid circuit connection is aligned with a fluid circuit and the second fluid circuit stop is aligned with the fluid circuit.

BRIEF DESCRIPTION OF THE DRAWINGS

FIG. 2 also illustrates the pump system when a pressure relief valve of the system is tripped.

Figure 1:
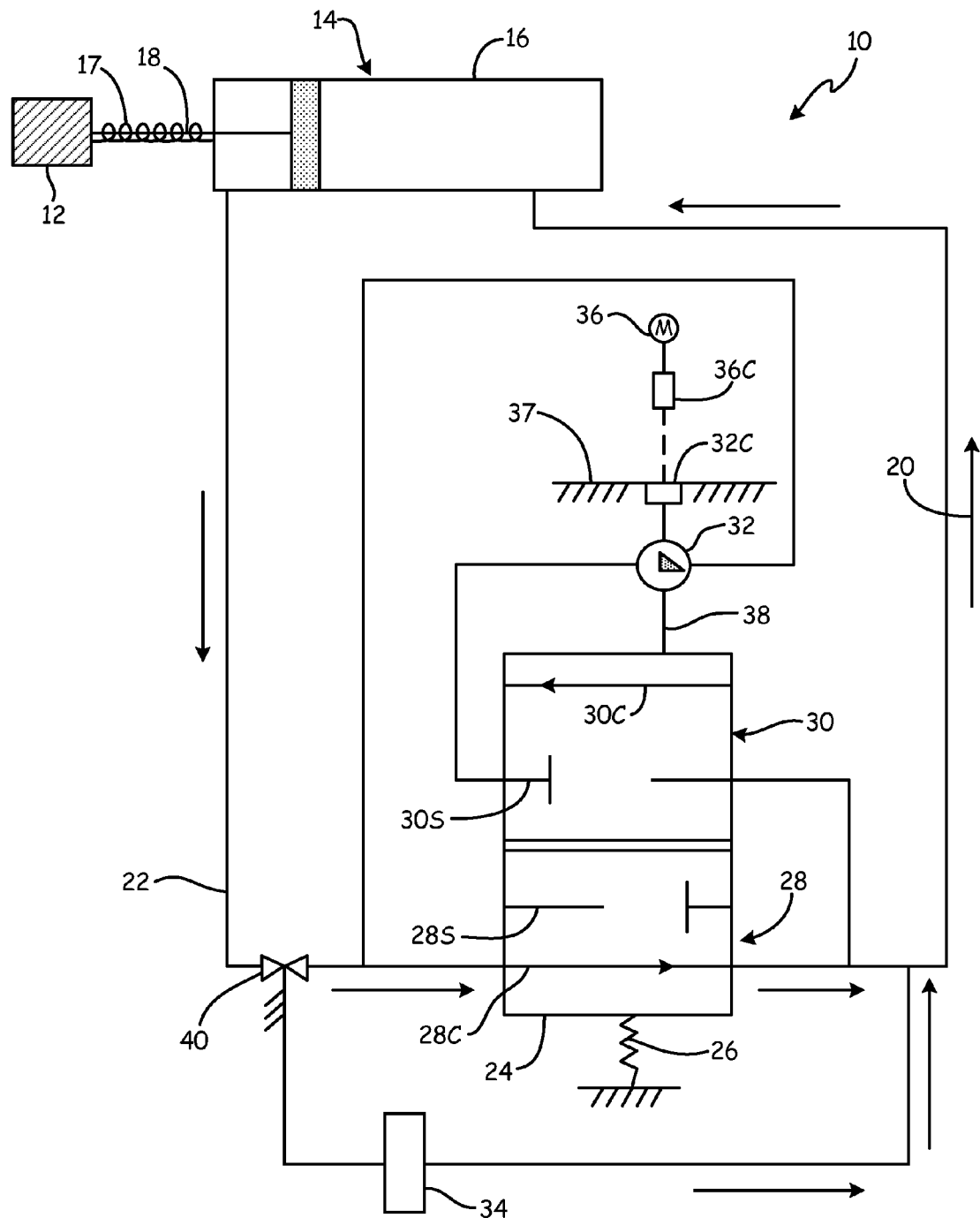
FIG. 1 is a schematic diagram of a pump system with an actuator in a deployed position.

While the above-identified drawing figures set forth one or more embodiments of the invention, other embodiments are also contemplated. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

Figure 2:
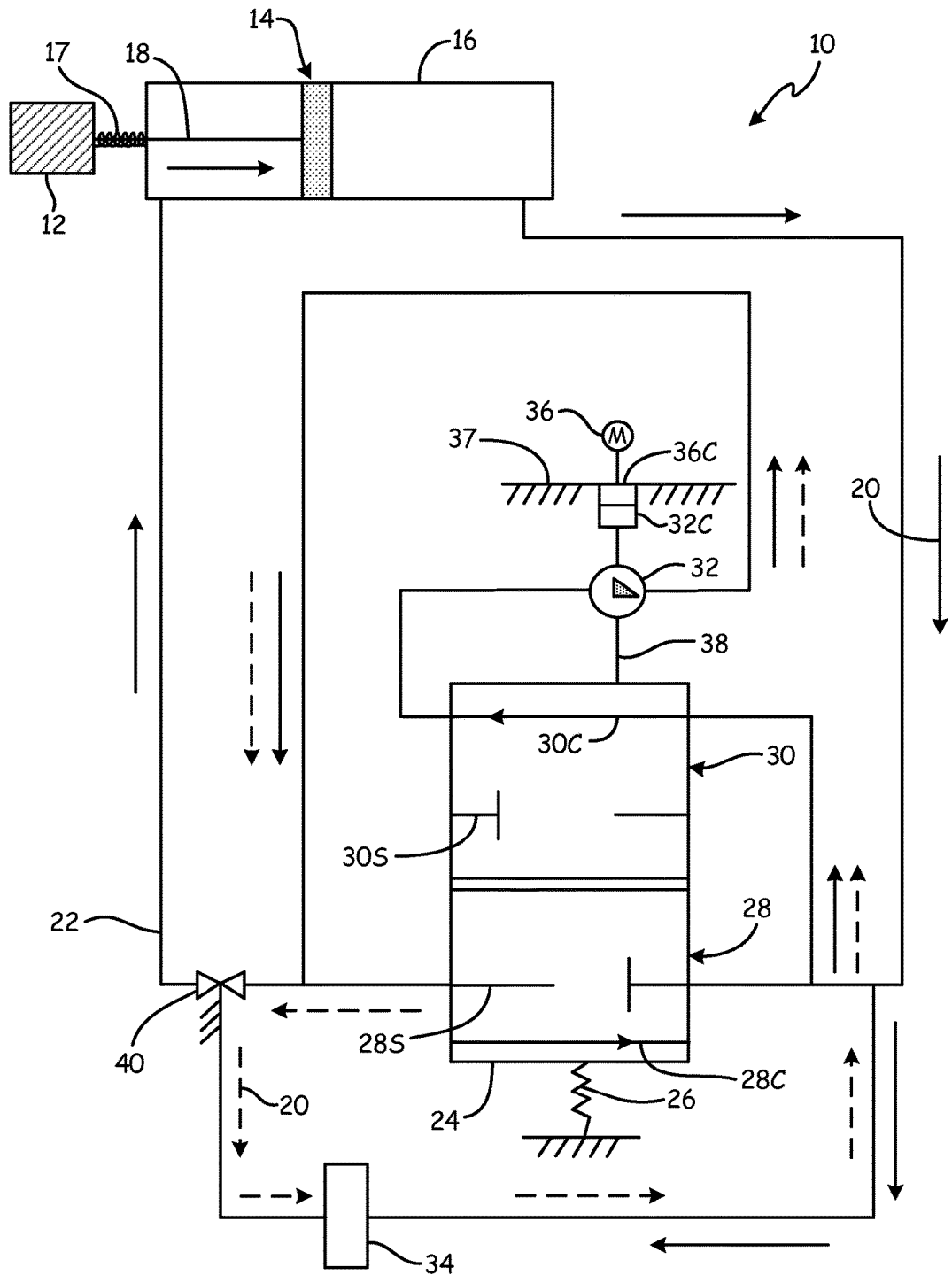
FIG. 2 is the schematic diagram of the pump system of FIG. 1 with a remote power device coupled to a pump and the actuator in a retracted position.

FIGS. 1 and 2 show a schematic diagram of pump system 10. Pump system 10 can be used to both deploy and stow ram air turbine ("RAT") 12. Pump system 10 can include actuator 14, fluid 20, fluid circuit 22 (which can include, for example, suitable hoses), spool valve 24, pump 32, reservoir 34, rotational power device 36, and relief valve 40.

As shown in FIG. 1, RAT 12 is in a deployed position. In the deployed position, RAT 12 extends out from an aircraft (not shown) and can be used to generate emergency power for the aircraft. RAT 12 is deployed (i.e. extends out) from the aircraft by actuator 14, which includes actuator cylinder 16, spring bias member(s) 17, and actuator piston rod 18. Actuator 14 deploys RAT 12 through the connection between RAT 12 and piston rod 18. In one embodiment, one or more spring bias members 17 can provide a deployment force for actuator 14. Spring bias member 17 can be an external spring as shown, or in other embodiments can be an internal spring assembly. For RAT 12 to be deployed by actuator 14, fluid 20 (e.g. conventional hydraulic fluid) must be allowed to flow relatively freely through fluid circuit 22. Fluid circuit 22 is unrestricted, allowing fluid 20 to flow freely both into and out from actuator 14, when spool valve 24 is in a free flow position as shown in FIG. 1.

Spool valve 24 is in fluid connection with fluid circuit 22 and can be, for instance, a sliding spool valve. Spool valve 24 can include spring 26, first portion 28, and second portion 30. Spring 26, in one embodiment, can be a compression spring and can be coupled to spool valve 24 at or near first portion 28 of spool valve 24. First portion 28 can include first fluid circuit connection 28C and first fluid circuit stop 28S, while second portion 30 of spool valve 24 can include second fluid circuit connection 30C and second fluid circuit stop 30S. First portion 28 and second portion 30 can be connected and move together, such that a force which moves, for example, second portion 30 will also move first portion 28. Spool valve 24 can also be connected to pump 32 via connection 38. Pump 32 can be, for example, a fixed displacement pump. Connection 38, as shown, can be at or near second portion 30 of spool valve 24.

In the illustrated embodiment shown in FIG. 1, spool valve 24 is spring loaded (i.e. biased) to the free flow position by spring 26. When spool valve 24 is in the free flow position, as shown in FIG. 1, first portion 28 has first fluid circuit connection 28C aligned with fluid circuit 22

(first fluid circuit stop 28S is offset from fluid circuit 22), which allows fluid 20 to flow freely through spool valve 24 and thus fluid circuit 22. When spool valve 24 is in the free flow position, second portion 30 has second fluid circuit stop 30S aligned with fluid circuit 22 (second fluid circuit connection 30C is offset from fluid circuit 22), which prevents fluid 20 from passing through second portion 30 and reaching pump 32.

After passing through spool valve 24, fluid 20 flows through fluid circuit 22 and enters cylinder 16. Spring bias member 17 provides force to move RAT 12 to the deployed position by providing an actuation biasing force on piston rod 18, causing piston rod 18 to move laterally at least partially out from cylinder 16. Spring bias member 17 is held in compression when RAT 12 is in the stowed position (as shown in FIG. 2), and the potential energy of spring bias member 17 is released when RAT 12 is deployed as shown in FIG. 1, causing RAT 12 to extend out. Fluid 20 can enter cylinder 16 and act to provide a snubbing or dampening function to help control movement of RAT 12 during deployment. In the illustrated embodiment, fluid 20 continually enters cylinder 16 at or near one end and exits at or near another end where fluid 20 re-enters fluid circuit 22. The free flow of fluid 20 through fluid circuit 22 as shown in FIG. 1 provides RAT 12 with the capability to deploy on command, rather than necessitating a delay to allow fluid 20 to begin to flow and reach actuator 14. Therefore, by spring loading spool valve 24 with spring 26 in the free flow position as shown, pump system 10 is capable of deploying RAT 12 immediately when needed.

Pump system 10 also includes reservoir 34. Reservoir 34 is in fluid connection with fluid circuit 22, and as such is therefore in fluid connection with actuator 14, and can serve several functions. Reservoir 34 can provide an access point for filling pump system 10 with fluid 20 as well as allow for bleeding off of excess air entrained in pump system 10. During deployment of RAT 12, reservoir 34 can provide a make-up flow of fluid 20 to fill a volume in cylinder 16 that was formerly occupied by piston rod 18 when piston rod 18 was substantially completely within cylinder 16 before deployment. Therefore, reservoir 34 can be sized to have a volume sufficient to provide the make-up flow to pump system 10. A volume sufficient to provide make-up flow will vary depending on, for example, a length of fluid circuit 22, a size of actuator 14, whether spring bias member 17 is internal or external (as shown) to the actuator 14, and other factors dependent on the set-up and application of pump system 10. Reservoir 34 also can serve to provide a space for fluid 20 to go under fluid 20 expansion or contraction conditions.

FIG. 2 is the schematic diagram of pump system 10 of FIG. 1, with RAT 12 in a stowed position. Rotational power device 36 can be coupled to pump 32 to cause fluid 20 to stow RAT 12.

To stow RAT 12, rotational power device 36 with drive coupling 36C is used. Rotational power device 36 can be, for example, an electric drill or a suitable wrench, such as a speed wrench or socket wrench, or any other similar device. Drive coupling 36C can be, for example, a square, Allen, Reynolds, Philips, or star (i.e. Torx®) drive, or any other type of coupling capable of being driven by rotational power device 36. Pump 32 has drive coupling 32C, which can be one compatible with drive coupling 36C. Couplings 32C and 36C can be selected such that couplings 32C and 36C can removably mate, allowing rotational power device 36 to power (i.e. drive) and provide torque to pump 32.

By coupling rotational power device 36 to pump 32 by removably mating couplings 32C and 36C, spool valve 24 is toggled to a stow position as shown in FIG. 2. Coupling rotational power device 36 to pump 32 applies a generally linear force along an axis of rotation of couplings 32C and 36C, and this force is then conveyed to spool valve 24 via connection 38 between pump 32 and spool valve 24. This causes spool valve 24 to translate or toggle in generally the same direction at which the (generally linear) force is applied to the stow position, compressing spring 26. In the stow position, first portion 28 of spool valve 24 has first fluid circuit stop 28S aligned with fluid circuit 22 (first fluid circuit connection 28C is offset from fluid circuit 22), which prevents fluid 20 from flowing freely through fluid circuit 22 as was the case as shown in FIG. 1. Fluid 20 is instead directed from spool valve 24 towards pump 32 as a result of second portion 30 of spool valve 24 having second fluid circuit connection 30C aligned with fluid circuit 22 (second fluid circuit stop 30S is offset from fluid circuit 22), which fluidly connects fluid circuit 22 with pump 32.

Fluid 20 reaches pump 32, powered by rotational power device 36, where pressurized fluid 20 is developed. Pressurized fluid 20 is then directed from pump 32 to actuator 14. At actuator 14, pressurized fluid 20 acts to push piston rod 18 back inside cylinder 16 (against biasing force of spring bias member 17), resulting in RAT 12 being retracted back towards the aircraft (not shown). Fluid 20 then exits cylinder 16 and returns to fluid circuit 22 where fluid 20 continually cycles as described until RAT 12 is fully stowed as desired. Consequently, when rotational power device 36 is coupled to pump 32, pump system 10 supplies hydraulic pressure to actuator 14 sufficient to stow RAT 12. In the illustrated embodiment, pump 32 is capable of developing pressurized fluid 20 in pump system 10 ranging from, for example, approximately 500 psig (3447 kPa) to 1500 psig (10,342 kPa).

In one embodiment, pump system 10 can include pressure relief valve 40. Pressure relief valve 40 can be located along fluid circuit 22 between, and in fluid connection with, pump 32 and actuator 14, such that pressurized fluid 20 leaving pump 32 passes through pressure relief valve 40 before reaching actuator 14. Pressure relief valve 40 can be set during assembly of pump system 10 to trip when a pressure of fluid 20 leaving pump 32 exceeds a threshold pressure level of fluid 20 needed to retract actuator 14. This can ensure that actuator 14 is not over-pressurized by fluid 20 during stowing. Additionally, use of pressure relief valve 40 in pump system 10 allows for pump system 10 to be used across multiple applications which require different levels of pressure in fluid 20 to retract actuator 14 and stow RAT 12. In one example, pressure relief valve 40 can be set to trip when a pressure in fluid 20 exceeds approximately the lowest amount of pressure needed to retract piston rod 18 in the particular application. Pressure relief valve 40 can also be configured such that pressure relief valve 40 is set during assembly to trip at a specific fluid 20 pressure level and cannot be adjusted in the field (i.e. externally, after assembly).

FIG. 2 also illustrates fluid circuit 22 when pressure relief valve 40 is tripped, with dashed arrows showing a flow path of fluid 20 when pressure relief valve 40 is tripped. Pressure relief valve 40 will trip when a pressure in fluid 20 exceeds a specified pressure level at which pressure relief valve 40 is set (e.g., a threshold pressure level in fluid 20 needed to retract actuator 14). When pressure relief valve 40 is tripped, fluid 20 is blocked or prevented from passing to actuator 14. Instead, pressurized fluid 20 from pump 32 passes through relief valve 40 to reservoir 34. Directing pressurized fluid 20 from pump 32 to reservoir 34, and not to actuator 14, can help ensure actuator 14 is not over-pressurized during stow and help preserve a useful life of actuator 14.

Once RAT 12 is stowed by actuator 14 as desired, rotational power device 36 drive coupling 36C can be uncoupled from drive coupling 32C of pump 32. When rotational power device 36 is uncoupled from pump 32, spring 26 is no longer compressed and toggles (i.e. spring loads) spool valve 24 back into the free flow position shown in FIG. 1. Consequently, fluid 20 is once again free to flow through fluid circuit 22 which allows RAT 12 to be deployable on command and without delay. Furthermore, spring loading spool valve 24 in the free flow position requires active coupling of rotation power device 36 to toggle spool valve 24 out of the critical free flow position which allows RAT 12 to be deployed, and thus reduces accidental toggling of spool valve 24 out of the free flow position which would prevent or delay deployment of RAT 12 in an emergency power outage. Visual indicators can be added to pump system 10 to indicate when spool valve 24 is in the free flow position. One such visual indicator could include adding a surface 37 around coupling 32C such that when spool valve 24 is in the free flow position coupling 32C is flush with surface 37 as shown in FIG. 1 (coupling 32C is displaced or not flush with surface 37 when spool valve 24 is in the stow position as shown in FIG. 2).

Pump system 10 eliminates a need to manually stroke a hydraulic pump by utilizing rotational power source 36, allowing for reduced RAT 12 installation time. Also, common tools, such as an electric drill, can be used to operate pump system 10. Additionally, components traditionally included on the aircraft as part of the RAT actuation system can instead be removed from the aircraft and incorporated as part of pump system 10 on the ground, as only actuator 14 needs to be included on the aircraft when pump system 10 is used. Remaining components can be fluidly connected with actuator 14 from the ground through fluid circuit 22, allowing for a smaller RAT actuation system package size and reduced weight on the aircraft. For example, a need for an on-board motor is eliminated which helps to reduce airborne weight. Furthermore, pump system 10 maintains hydraulic independence from the aircraft's hydraulic systems, increasing the safety and reliability of pump system 10.

Discussion of Possible Embodiments

The following are non-exclusive descriptions of possible embodiments of the present invention.

A pump system comprising: an actuator which can be retracted by a fluid in the pump system; a pump with a first drive coupling; a rotational power device with a second drive coupling, wherein the second drive coupling is configured to removably mate with the first drive coupling for powering the pump; a spool valve that is spring loaded and in fluid connection with the pump when the spool valve is in a stow position; a relief valve in fluid connection with the actuator; and a reservoir in fluid connection with the actuator.

The pump system of the preceding paragraph can optionally include, additionally and/or alternatively, any one or more of the following features, configurations and/or additional components:

The spool valve is spring loaded to a free flow position and is toggled to the stow position when the second drive coupling is mated with the first drive coupling.

When the spool valve is in the free flow position the fluid in the pump system bypasses the pump.

When the spool valve is in the stow position fluid flows in a direction from the spool valve to the pump.

When the spool valve is in the stow position pressurized fluid is developed at the pump and directed from the pump to the actuator to retract the actuator.

The pump develops pressurized fluid in the pump system ranging from approximately 500 psig (3447 kPa) to 1500 psig (10,342 kPa).

The rotational power device is selected from the group consisting of an electric drill, a speed wrench, and a socket wrench.

The relief valve is set to trip when a pressure of the fluid in the pump system exceeds a threshold pressure level of the fluid needed to retract the actuator.

When the relief valve is tripped the fluid in the pump system flows directly from the pump to the reservoir.

A method for retracting an actuator in a pump system, the method comprising: coupling a rotational power device to a pump for powering the pump; toggling a spring loaded spool valve to a stow position to direct a fluid in the pump system to flow from the spool valve to the pump; directing the fluid from the pump through a relief valve and to an actuator; and retracting the actuator with the fluid in the pump system.

The method of the preceding paragraph can optionally include, additionally and/or alternatively, the following techniques, steps, features and/or configurations:

The spring loaded spool valve is toggled to the stow position by coupling the rotational power device to the pump.

Tripping the relief valve when a pressure of the fluid exceeds a threshold pressure level of the fluid needed to retract the actuator such that the fluid is prevented from being directed to the actuator.

Directing the fluid from the relief valve to a reservoir.

Uncoupling the rotational power device from the pump such that the spring loaded spool valve is moved to a free flow position.

Retracting the actuator comprises stowing a ram air turbine.

A spool valve comprising: a connection with a pump, wherein the connection allows the spool valve to toggle between a free flow position and a stow position; a spring coupled to the spool valve; a first portion with a first fluid circuit connection and a first fluid circuit stop; and a second portion with a second fluid circuit connection and a second fluid circuit stop, wherein when the spool valve is in the free flow position the first fluid circuit connection is aligned with a fluid circuit and the second fluid circuit stop is aligned with the fluid circuit.

The spool valve of the preceding paragraph can optionally include, additionally and/or alternatively, any one or more of the following features, configurations and/or additional components:

The spring is coupled to the spool valve at or near the first portion and the connection with the pump is at or near the second portion.

When the spool valve is in the stow position the first fluid circuit stop is aligned with the fluid circuit and the second fluid circuit connection is aligned with the fluid circuit.

The spool valve is configured to be spring loaded to the free flow position.

The spool valve is toggled to the stow position upon coupling a rotational power device to the pump.

Any relative terms or terms of degree used herein, such as "generally", "substantially", "approximately", and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, temporary alignment or shape variations induced by operational conditions, and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A pump system comprising:
   an actuator which can be retracted by a fluid in the pump system;
   a pump with a first drive coupling;
   a spool valve toggleable between a stow position that fluid connects the pump to the actuator, and a free flow position that bypasses the pump, wherein the spool valve is spring loaded to the free flow position;
   a rotational power device with a second drive coupling, wherein the second drive coupling is configured to removably mate with the first drive coupling for powering the pump, and wherein engaging the first drive coupling with the second drive coupling simultaneously rotationally couples the rotational power device to the pump and toggles the spool valve into the stow position such that when the spool valve is in the stow position, the fluid flows in a direction from within the spool valve to the pump;
   a relief valve in fluid connection with the actuator; and
   a reservoir in fluid connection with the actuator.

2. The pump system of claim 1, wherein when the spool valve is in the stow position pressurized fluid is developed at the pump and directed from the pump to the actuator to retract the actuator.

3. The pump system of claim 2, wherein the pump develops pressurized fluid in the pump system ranging from approximately 500 psig (3447 kPa) to 1500 psig (10,342 kPa).

4. The pump system of claim 1, wherein the rotational power device is selected from the group consisting of an electric drill, a speed wrench, and a socket wrench.

5. The pump system of claim 1, wherein the relief valve is set to trip when a pressure of the fluid in the pump system exceeds a threshold pressure level of the fluid needed to retract the actuator.

6. The pump system of claim 1, wherein when the relief valve is tripped the fluid in the pump system flows directly from the pump to the reservoir.

7. A method of retracting an actuator in a pump system, the method comprising:
   mating a drive coupling of a rotational power device to a drive coupling of a pump, thereby simultaneously coupling the rotational power device to the pump for powering the pump, and toggling a spring loaded spool valve to a stow position to direct a fluid in the pump system to flow from the spool valve to the pump;
   directing the fluid from the pump through a relief valve and to an actuator; and
   retracting the actuator with the fluid in the pump system.

8. The method of claim 7, further comprising:
   tripping the relief valve when a pressure of the fluid exceeds a threshold pressure level of the fluid needed to retract the actuator such that the fluid is prevented from being directed to the actuator.

9. The method of claim 8, further comprising:
   directing the fluid from the relief valve to a reservoir.

10. The method of claim 7, further comprising:
    uncoupling the rotational power device from the pump such that the spring loaded spool valve is moved to a free flow position.

11. The method of claim 7, wherein retracting the actuator comprises stowing a ram air turbine.

* * * * *